UNITED STATES PATENT OFFICE.

THOMAS L. THOMPSON, OF KINGFISHER, OKLAHOMA.

WOOD-FILLING COMPOSITION.

1,088,637. Specification of Letters Patent. Patented Feb. 24, 1914.

No Drawing. Application filed August 21, 1913. Serial No. 785,966.

*To all whom it may concern:*

Be it known that I, THOMAS L. THOMPSON, a citizen of the United States, residing at Kingfisher, in the county of Kingfisher and State of Oklahoma, have invented certain new and useful Improvements in Wood-Filling Composition; and I do declare the following to be a full, clear, and exact description of the invention, such as will enable others skilled in the art to which it appertains to make and use the same.

This invention relates to improvements in wood filling compositions.

One object of the invention is to provide a composition of this character designed for filling woods of different kinds and which may be employed on both inside and outside work.

This composition is produced from the pulp and juice of the China berry, the scientific name of which is *Melia azedarach*, combined with salicylic acid. In the formation of the composition the berries are placed in a vat and sufficient water added to cover the berries. The water and berries are then boiled until the pulp and skins of the latter drop from the seeds. After the berries have been thus boiled the seeds and skins are separated from the liquor and pulp preferably by passing them through a fruit press. After the seeds and skins have been this removed the pulp and juice are strained and placed in a vessel to cool. After becoming cool salicylic acid is combined therewith in the proportions of one ounce of acid to every two gallons of juice after which the mixture is ready for use.

This liquid may be bottled and employed when desired and will be found to be an efficient filling compound for all kinds or wood on which a filler is used and may be employed equally well on both inside and outside work.

If desired the filler may be colored by the addition of various pigments or dry paint such as ocher, umber, burnt sienna and the like in suitable quantities to produce the desired color and shade and when thus colored forms an efficient and durable stain for coloring the wood to which it is applied.

I claim as my invention:

1. A wood filling composition composed of the juice of the China berry combined with salicylic acid.

2. A wood filling composition composed of two gallons of juice of the China berry combined with one ounce of salicylic acid.

3. A wood filling composition composed of the juice of the China berry combined with salicylic acid and a suitable coloring matter.

4. A method of producing a wood filling composition which consists in boiling China berries in water until the pulp separates from the seeds and then extracting the juice of the boiled berries and combining it with salicylic acid.

In testimony whereof I have hereunto set my hand in presence of two subscribing witnesses.

THOMAS L. THOMPSON.

Witnesses:
 CHAS. T. SPEICE,
 R. B. LAING.

Copies of this patent may be obtained for five cents each, by addressing the "Commissioner of Patents, Washington, D. C."